A. A. TIRRILL.
REGULATOR FOR STORAGE BATTERIES.
APPLICATION FILED DEC. 14, 1907.
996,379.
Patented June 27, 1911.
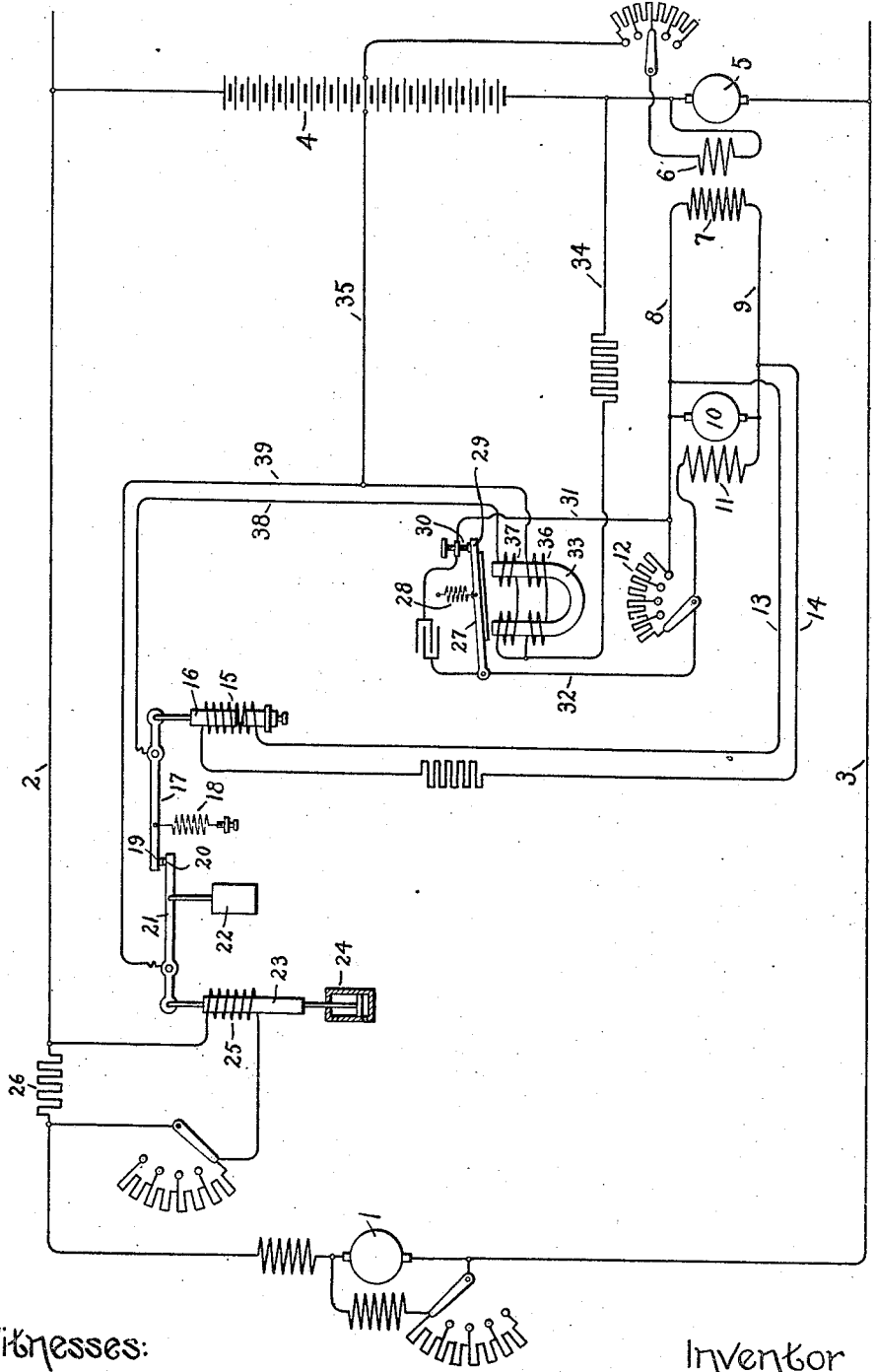
Witnesses:
J. Ellis Glew.
J. Earl Ryan
Inventor
Allen A. Tirrill,
by Allen H. Davis
Att'y.

UNITED STATES PATENT OFFICE.

ALLEN A. TIRRILL, OF SCHENECTADY, NEW YORK, ASSIGNOR TO GENERAL ELECTRIC COMPANY, A CORPORATION OF NEW YORK.

REGULATOR FOR STORAGE BATTERIES.

996,379.   Specification of Letters Patent.   Patented June 27, 1911.

Application filed December 14, 1907. Serial No. 406,430.

*To all whom it may concern:*

Be it known that I, ALLEN A. TIRRILL, a citizen of the United States, residing at Schenectady, county of Schenectady, State of New York, have invented certain new and useful Improvements in Regulators for Storage Batteries, of which the following is a specification.

My invention relates to regulators for boosters and similar dynamo electric machines in which it is necessary to generate a voltage in different directions, and more particularly for boosters connected in series with storage batteries to regulate the charging and discharging of the batteries.

The voltage delivered by a dynamo electric machine or booster may be readily and accurately controlled by causing the current to flow intermittently through the field coil for periods which are varied in length and frequency according to the demands of the machine, by some forms of Tirrill regulator, comprising an electromagnet responsive to either current or voltage and arranged to open and close several hundred times per minute a circuit which affects the field coil of the booster. The regulator may be arranged to reverse the direction of the field current and thereby reverse the direction of the voltage generated by the machine, but this mode of operation causes the current through the regulating magnet to die down to zero as the field current reverses, and may result in unsatisfactory operation of the regulating magnet during the time the voltage of the machine is below a certain point. It is therefore desirable to be able to reverse the voltage of the machine without lowering the voltage on the regulator magnet below the point at which its operation is uniformly satisfactory.

The object of my invention is to provide a regulating system for boosters and similar devices in which a regulator of the Tirrill type may be used to vary the voltage of the booster from zero to maximum in either direction without causing the current through or the voltage applied to the regulator either to reverse or to exceed the upper and lower limits within which its operations are reliable and satisfactory; in which an exciter varies the amount and direction of the booster voltage without changing the direction of current in the exciter circuit; in which the current in the exciter circuit is varied by the regulator without variations of voltage on the regulator magnet exceeding the limits within which the operation is satisfactory; and in which the control of the booster voltage is quicker and more accurate than in the systems heretofore used.

In carrying out my invention, the booster is provided with a separately excited field coil, to produce a practically constant magnetomotive force in one direction, and also with an opposing coil which develops an opposing magnetomotive force and is so proportioned that at maximum excitation it overpowers the other shunt coil and causes the booster to generate maximum voltage in one direction, while at minimum excitation its effect is so slight that it is overpowered by the other shunt coil to such an extent that the booster develops maximum voltage in the other direction. The flow of the current through the opposing coil is varied in any suitable way, preferably by varying the voltage impressed on the coil by means of a regulator responsive both to load on the main circuit and to the voltage impressed on the opposing coil, which varies in accordance with the work required of the booster. The opposing coil is so proportioned that the upper and lower limits of the voltage required to be applied to it to produce the desired variations in the booster voltage are well within the limits of satisfactory operation of the regulator magnet. In the preferred arrangement, the variable voltage is applied to the opposing coil by an exciter having its circuit directly connected to the opposing coil and provided with a field coil connected in shunt to the exciter circuit through a resistance intermittently short-circuited by two coöperating vibratory contacts, one controlled by a regulator magnet responsive to voltage on the exciter circuit and the other by a magnet responsive to the load on the system. The normal voltage on the exciter circuit, which sends just enough current through the opposing field coil of the booster to enable it to counterbalance the shunt field coil, is high enough so that when reduced to a fraction, such as one-half of the normal voltage, the current flowing through the opposing coil is low enough to permit maximum voltage in one direction from the booster, due to the action of the shunt coil, although the exciting circuit voltage is still high enough to make the operation of the regulator magnet entirely satisfactory.

One form in which my invention may be embodied is shown merely for purposes of illustration in the accompanying drawing, in which a generator or other suitable source of supply 1 furnishes current to the leads 2 and 3 of a main circuit. A constant load on the generator is maintained by a secondary battery 4 connected across the main circuit in parallel with the generator and controlled by means of a booster 5 arranged to generate a voltage in one direction to charge the battery and a voltage in the other direction to discharge the battery, the voltage of the booster in either direction being varied to control the rate of charging and discharging.

In the preferred arrangement, the booster is provided with a separately excited field coil 6 connected to the battery through a suitable regulating resistance for the purpose of generating a practically constant magnetomotive force in one direction and also with an opposing or differential field coil 7 proportioned to produce under normal conditions a magnetomotive force opposite in direction and equal in amount to that produced by the coil 6. The opposing coil 7 is energized by a uni-directional current from an exciting circuit having leads 8 and 9 connected to the coil, which is so proportioned that maximum current through it overpowers the coil 6 to such an extent that the booster generates a maximum voltage in one direction, while the minimum current through the opposing coil permits the coil 6 to cause the generator to develop a maximum voltage in the other direction so that changes in amount, but not in direction, of the current through the opposing coil causes changes either in direction or amount of voltage of the booster. The effect of the opposing coil 7 is preferably varied by varying in any suitable way the voltage impressed upon it from the exciting circuit in accordance with the load on the generator 1 and the voltage on the exciting circuit. The variations of voltage are preferably controlled by means of a regulator of the Tirrill type in which coöperating vibratory contacts intermittently open and close a circuit for varying the voltage of the exciting circuit, one of the contacts being actuated by means responsive to load on the generator and the other by means responsive to voltage on the exciting circuit. In the embodiment of my invention shown in the drawing, the exciting circuit for the opposing coil 7 is supplied with uni-directional current from an exciter 10 having a field coil 11 connected in shunt to the exciting circuit through a regulating resistance 12.

The voltage on the exciter circuit is varied by varying the excitation of the field coil 11 of the exciter, preferably by means of vibratory contacts responsive both to load on the generator and to voltage on the exciting circuit and arranged to short-circuit intermittently the resistance 12 thereby causing variations in the duration of flows of current through the field coil 11.

The regulator is rendered responsive both to fluctuations of load on the main circuit and to fluctuations of voltage on the exciter circuit. For this purpose it is provided with two control magnets, one of which, magnet 15, is connected by means of conductors 13, 14 across the exciter mains 8, 9. The magnet 25 is responsive to the fluctuations of the load on the line, and is connected across the resistance 26 in this circuit. The core 16 of magnet 15 is connected to a pivoted lever 17 normally held against the pull of the core by means of a spring 18. The lever 17 coöperates with a lever 21 connected to the core 23 of the magnet 25. The lever 21 is pivoted with a counterweight 22, which works in opposition to the core 23. The movement of the core is retarded by a dash-pot 24 for preventing sudden and violent changes in the position of the core. The lever 17 carries a contact 19, and the lever 21 a contact 20. These contacts short circuit by their closure the resistance 12 in the field of the exciter 10, either directly or by means of a relay, as in the present case, in order to vary the voltage of the exciter current and thereby the magneto motive force of coil 7.

Under normal conditions, the main contacts 19 and 20 vibrate into and out of engagement with each other in such a manner that the voltage on the exciting circuit causes the opposing coil 7 to counterbalance the coil 6 and the battery floats on the line. If the amount of current furnished by the generator varies, the position of the main contact 20 correspondingly varies and alters the length and duration of the flows of current through the exciter field 11, thereby changing the voltage on the exciter circuit between predetermined upper and lower limits which are well within the limits at which the coil 15 operates satisfactorily and causing the opposing coil to vary the voltage of the booster just enough to compensate for the changes in load.

If desired, the main vibratory contacts 19 and 20 could control directly a shunt circuit around the resistance 12, but it is preferable to control the shunt circuit by a relay having a relay armature 27 which vibrates in synchronism with the pivoted lever 17 due to the action of a relay magnet which attracts the armature and a spring 28 which pulls the armature away from the magnet. The relay armature 27 carries a contact 29 coöperating with a relay contact 30 to open and close intermittently a shunt circuit around the resistance 12 consisting of leads 31 and 32 connected to opposite ends of the resistance so that when the relay contacts are in engagement, the resistance is short-circuited and maximum current flows through the exciter field 11. The sparking at the relay contacts is lessened by means of a condenser connected in shunt with the relay contacts, as is customary in regulators of the Tirrill type. The relay armature 27 is moved against the tension of spring 28 by means of a differential relay magnet 33 preferably energized from the storage battery through leads 34 and 35 and provided with differential windings 36 and 37, one winding 36 being connected in shunt directly across the leads 34 and 35 and the other secondary or differential winding 37 being also connected across the circuit 34, 35 through leads 38 and 39 connected to the main floating vibratory contacts 19 and 20 so that the circuit of the coil 37 is intermittently opened and closed to cause the relay armature to vibrate in synchronism with the lever 17. The closing of the contacts 19 and 20 causes the coils 36 and 37 to counterbalance each other, permitting the spring 28 to move the relay armature away from the magnet, thereby closing the shunt circuit around the resistance 12 and causing a maximum excitation of the field of the booster, while a separation of the contacts 19 and 20 renders the coil 37 ineffective and permits the coil 36 to energize the magnet 33 sufficiently to attract the armature 27 and separate the relay contacts 29 and 30, thereby cutting the resistance 12 into circuit with the field coil of the booster to cause a minimum excitation of the field of the booster.

The operation of the system is as follows: Under normal conditions, the generator furnishes just enough current for the normal load, the main contacts 19 and 20 vibrate into and out of engagement with each other at such a rate that the exciter 10 furnishes the opposing coil 7 with just enough current to counterbalance the coil 6, so that the booster generates no voltage, and the secondary battery floats on the line. The coil 6 is connected into the battery in accordance with the resistance of the coil and the voltage of the battery to produce any desired number of ampere turns, while the opposing or differential coil 7 is proportioned to give an equal number of ampere turns in the opposite direction at the normal voltage of the exciting circuit, which may be any desired amount, such as 80 volts. Under normal conditions the two windings exactly neutralize each other, and the battery and booster float on the system, although the exciter voltage across the exciter magnet 15 is 80 volts, at which amount it is maintained by the constant opening and closing of the main contacts and the corresponding action of the relay contacts. If the load on the generator begins to increase, the generator attempts to send more current through the shunt 26 causing the current magnet 25 to strengthen and lift the core 23, thereby lowering the main vibratory contact 20, and causing both the main and relay contacts to be open for a greater length of time during each vibration of the contacts, so that the intermittent flows of current through the field coil 11 diminish either in duration or frequency, or both, correspondingly diminishing the voltage of the exciter circuit until the coil 6 overpowers the opposing coil 7 to such an extent that the booster voltage is built up in a direction to discharge the battery into the line at the proper rate to cause the load on the generator to be maintained constant. As the load on the system becomes steady, although above normal, the vibrations of the main and relay contacts become such that a steady exciter voltage is maintained corresponding to the abnormal load. The parts are so proportioned that when the exciting circuit voltage is reduced a certain fraction, for example one half, it reaches a lower limit at which the booster develops the maximum required voltage in a direction to discharge the battery, although the voltage in the exciting circuit is still well above the point at which the control magnet 15 operates satisfactorily. If the load begins to decrease from normal, the generator 1 attempts to furnish less current, weakening the current control magnet 25, whereupon the main vibratory contact 20 rises and causes both the main and relay contacts to be closed for a longer time during each vibration of the contacts and increases either the duration or frequency, or both, of the flows of current through the field coil of the exciter, until the exciter voltage is raised enough to cause the opposing coil 7 to overpower coil 6 and build up the booster until the battery is being charged at the proper rate to maintain a constant load on the generator.

It will be observed that as a result of extreme variations in load the booster has developed voltages ranging from a maximum in one direction through zero to a maximum in the other direction due to changes in amount, but not in direction of the voltage in the exciting circuit which varies between definite upper and lower limits, within which the operation of the exciter magnet 15 is entirely satisfactory. These limits might be 110 and 50 volts where the normal voltage is 80, but of course, both the normal voltage and the upper and lower limits may be varied to suit different conditions without departing from my invention.

What I claim as new, and desire to secure by Letters Patent of the United States, is,

1. The combination with a dynamo electric machine having a separately excited field coil and an opposing field coil, of an independent exciting circuit connected to said opposing coil, and regulating means for varying the voltage on said exciting circuit between predetermined upper and lower limits.

2. In a system of distribution, the combination with a main circuit having a booster connected thereto and provided with a separately excited field coil and an opposing field coil, of an exciting circuit independent of said main circuit connected to said opposing field coil, and regulating means responsive to load on the main circuit and to voltage on the exciting circuit for raising the voltage on the exciting circuit above the normal and lowering said voltage to a fraction of the normal to cause the booster to develop maximum voltage in either direction.

3. The combination with a booster having a separately excited field coil and an opposing field coil, of an exciting circuit connected to said opposing coil to cause the booster to develop maximum voltages in opposite directions at predetermined upper and lower limits of voltage on the exciting circuit, and an electromagnetic regulator for varying the voltage on said circuit between said predetermined limits.

4. In a system of distribution, the combination with a main circuit, a secondary battery connected to said circuit, and a booster in series with the battery, of differential field coils for said booster, an exciter circuit for supplying unidirectional voltage to one of said coils, and regulating means for varying the voltage of said exciting circuit between predetermined upper and lower limits, said regulating means being responsive both to current in the main circuit and to voltage on the exciting circuit.

5. In a system of distribution, the combination with a circuit, a secondary battery connected to the circuit, and a booster in series with the battery, of a field coil for the booster energized by the battery, an opposing field-coil connected to a source of unidirectional current and proportioned to cause the booster to develop the maximum voltage in one direction at a predetermined upper limit of current and in the other direction at a predetermined lower limit of current, and means responsive to load on the circuit for varying said current within said limits.

6. In a system of distribution with a main circuit, a secondary battery connected to the circuit, and a booster in series with the battery, of a separately excited coil and an opposing coil on the field of the booster, an exciting circuit for supplying unidirectional voltage to the opposing coil, and means responsive to load on the main circuit for varying the exciting circuit voltage within predetermined limits.

7. In a system of distribution, the combination with a main circuit, a secondary battery connected to said circuit, and a booster in series with the battery, of a separately excited coil and an opposing coil on the field of the booster, an exciting circuit for supplying unidirectional voltage to the opposing coil, coöperating contacts for opening and closing a circuit to vary the voltage on the exciting circuit, a magnet in series with the main circuit for controlling one of said contacts and a magnet connected across the exciter circuit for controlling the other contact.

8. In a dynamo electric machine, the combination with a separately excited field coil and an opposing field coil of an exciter connected in series with said opposing coil, a field coil for said exciter, and a regulator for varying the duration of current through said field coil.

9. In a system of distribution comprising a main circuit having a booster connected thereto, the combination with a separately excited field coil and an opposing field coil for the booster, of an exciter connected in series with said opposing coil, a field coil for said exciter, a resistance in series with said field coil, coöperating contacts for short-circuiting said resistance, and means responsive to load on the main circuit and to voltage on the exciter circuit for actuating said contacts.

10. In a system of distribution, the combination of a main circuit, a storage battery connected to said circuit, a booster in series with said battery, opposing field coils for said booster, one of which is excited by the storage battery, a source of current distinct from the main circuit for exciting the other field coil, and automatic means for varying the magnetomotive force produced by one of said coils in accordance with the variations of load on the main circuit.

In witness whereof, I have hereunto set my hand this 12th day of December, 1907.

ALLEN A. TIRRILL.

Witnesses:
BENJAMIN B. HULL,
HELEN ORFORD.

Copies of this patent may be obtained for five cents each, by addressing the "Commissioner of Patents, Washington, D. C."